May 10, 1949.   F. F. SILVER   2,469,849
METHOD OF SPLICING BUTYL RUBBER
Filed Jan. 19, 1946

FRANK F. SILVER
INVENTOR.

BY

Patented May 10, 1949

2,469,849

UNITED STATES PATENT OFFICE 2,469,849

METHOD OF SPLICING BUTYL RUBBER

Frank F. Silver, Akron, Ohio, assignor to Wingfoot Corporation, Akron, Ohio, a corporation of Delaware Application January 19, 1946, Serial No. 642,385

9 Claims. (Cl. 154—14)

1

This application relates to an improvement in the method of splicing butyl rubber, especially in the manufacture of inner tubes and air bags.

The manufacture of inner-tubes at the present time quite generally utilizes continuous extruding machinery in which unvulcanized rubber having incorporated therein the necessary vulcanizing agents, accelerators, antioxidants, and pigments is fabricated into a continuous tube. Sections of this continuous tube are then cut in desired lengths and the ends thereof spliced together to form a closed sealed structure. A suitable mechanical air valve is inserted at the desired point and the entire unit is vulcanized by heating at a suitable temperature for the necessary length of time to produce a tough heat-resistant composition. The temperatures and times of cure will vary, depending upon the type of rubber and the nature of the curing agents incorporated therein. Such details are well known to the art and are not regarded as part of this invention.

At the present time, many inner-tubes and air-bags are made from butyl rubber because it is superior to natural rubber in retaining air or other gases used for inflation. However, in the manufacture of inner-tubes it has been found that butyl rubber has inherent disadvantages due to its lack of cohesive strength and the difficulty of making a spliced joint which will retain air under a pressure necessary to inflate the inner tube prior to the curing operation. Accordingly, it is the purpose of this invention to provide a method of manufacturing inner-tubes in which the separation of the splice during the inflation operation is completely avoided or minimized.

Butyl rubber is a copolymer of 0.25 to 10 percent of a conjugated diolefin hydrocarbon and from 90 to 99.75 percent of an iso-olefin. The principal butyl rubber is the copolymer of a substantial proportion of iso-butylene with a minor proportion of isoprene. Suitable conjugated diolefines for the manufacture of butyl rubber are: butadiene-1,3 isoprene, and other alkyl-substituted derivatives of butadiene-1,3. Suitable iso-olefins for the manufacture of butyl rubber are isobutylene, isopentenes and other branched chain mono-olefin hydrocarbons. Butyl rubbers are manufactured by the conjoint polymerization of the conjugated diolefin hydrocarbons and the iso-olefines in the presence of a Friedel-Crafts catalyst, such as aluminum chloride, boron trifluoride and stannic chloride. The polymerizations generally are conducted at sub-normal temperatures, for example $-50°$ F.,

2 to form solid polymers having molecular weights between 20,000 and 250,000 and iodine numbers between 2 and 40. The comonomers are frequently mixed in the reactor in proportions higher in diolefines than appear in the ultimate copolymer. Thus, although the copolymer usually is one of .25 to 10 percent, and preferably 1 to 5 percent, of the diolefin, the proportion of diolefin in the feed may be up to two (2) times as great when isoprene is used and up to four (4) times as great when the less reactive butadiene-1,3 is used.

The butyl rubber is compounded by procedures well known to the art. Fillers and reinforcing agents, such as carbon black, magnesia and zinc oxide are milled into the butyl rubber by means of roll mills or Banbury type mixers. Sulfur is usually added as a vulcanizing agent, while antioxidants, such as phenylbeta-naphthylamine, and accelerators such as 2-mercaptobenzothiazole, tetramethyl thiuram-disulfide, and dibenzo-p-quinonedioxime are also milled into the composition.

The improved method of manufacturing inner tubes of butyl rubber utilizes most of the conventional operations. The butyl rubber is extruded in the usual fashion and cut to a predetermined length. The ends of the cut lengths of butyl rubber tubing are then spliced, using any of the many types of splicing machinery available to the art. Suitable mechanical valves are inserted by punching the tubes at a desirable point and inserting the valve securely by gripping the periphery of the punched hole in a suitable tight-fitting ring nut or other mechanical device.

The prior art method, which is quite satisfactory in the fabrication of natural rubber tubes, is to insert the uncured inner tube into a mold having an interior surface thereof of the identical size and shape desired in the finished inner tube. The uncured inner tube is then inflated with air or other suitable gas to stretch or otherwise force the inner tube against the interior mold surface. The mold is then heated to the necessary temperature to effect vulcanization.

If the same methods are attempted for the manufacture of butyl tubes, it will be found that a high proportion of the spliced joints will separate during the inflation operation due to the lack of cohesive strength of the butyl rubber.

It has been discovered, in accordance with the present invention, that if the spliced butyl rubber joint is cooled so that all parts of the joint are at a temperature less than 50° F. and preferably between 0° F. and 40° F., the spliced joints will not open during the inflation operation. It is necessary that this temperature be maintained until the tube is completely inflated, at which time the danger of joint separation no longer exists because the rubber parts are maintained in their desired position by contact with the mold. This contact is maintained by the air pressure within the inner tube. The mold may then be heated to effect the desired vulcanization without further danger of the separation of the spliced ends.

The cooling step may be effected by any refrigeration operation. Because the butyl rubber is a poor conductor of heat, it is generally desirable to contact the rubber with a liquid having a temperature of 32° F. or less. Although refrigerated brine or other cooling mediums may be used, it is desirable to use a readily volatile organic solvent which does not affect the butyl rubber and which will evaporate without seriously interfering with the usual manufacturing operations. A very desirable cooling medium is a mixture of solid carbon dioxide in a readily volatile organic liquid, such as acetone. The carbon dioxide-acetone mixture will have a temperature of about −60° to −90° F. and will therefore be very effective in cooling the butyl rubber rapidly to the desired low temperature. The spliced joints may be dipped in the refrigerating solution for 5 to 60 seconds, or may be painted, sprayed or otherwise contacted by any conventional method.

The details of the invention will be more fully described with respect to the accompanying drawings, of which Fig. 1 is a fragmentary view, partially in section, of a spliced inner tube in which a lap joint has been used.

Figure 1:
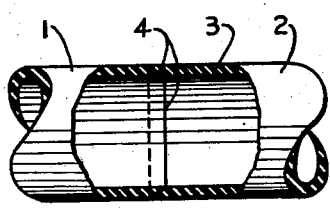
Figure 2:
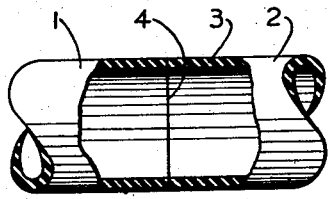
Fig. 2 is a fragmentary view of a spliced inner tube partially in section, showing a butted joint.

In the accompanying drawings 1 and 2 represent the opposite ends of a straight section of extruded tubing having side walls 3. The ends of the tube are joined by a splice 4 which may either be butted as in Fig. 2 or lapped as in Fig. 1 in the manner well known to the art of inner-tube manufacture. After the spliced inner tube has been punched and a valve inserted, the inner-tube is introduced into a mold which may be the watch-case type shown in Figs. 3 and 4. The upper and lower edges of the mold 5 and 6 are separable and fastened by any conventional hinge mechanism 7. The lower mold half may extend above the tube center on inside or rim diameter. The tread diameter and cross-section diameter of the mold interior should be slightly larger than the corresponding diameters of the unvulcanized inner-tube. The spliced joint of the inner-tube is cooled by contacting with any refrigerating device until the temperature of the joint is at or below 50° F. The inner-tube is then inserted in the mold with the valve protruding through the opening 8 and the mold closed. The tube may then be inflated without danger of the seams opening, provided that the inflation is completed while the joint is still cold and the inner tube expanded to contact all parts of the interior surface of the mold. The mold is subsequently heated in the conventional manner to complete the vulcanization.

The invention is also applicable in the manufacture of air-bags or curing-bags which are made of butyl rubber by methods identical to those described above for inner-tubes.

Further details of the practice of this invention are set forth in the following specific example.

*Example*

An inner tube for a 10.00 x 15 truck tire was made by extruding a continuous tube of butyl rubber having the following composition:

| | Parts by weight |
|---|---|
| Butyl rubber | 100 |
| Carbon black | 50 |
| Zinc oxide | 5 |
| Mineral oil | 2 |
| 2-mercaptobenzothiazole | 0.50 |
| Tetramethyl thiuram disulfide | 1 |
| Sulfur | 2 |

Figure 3:
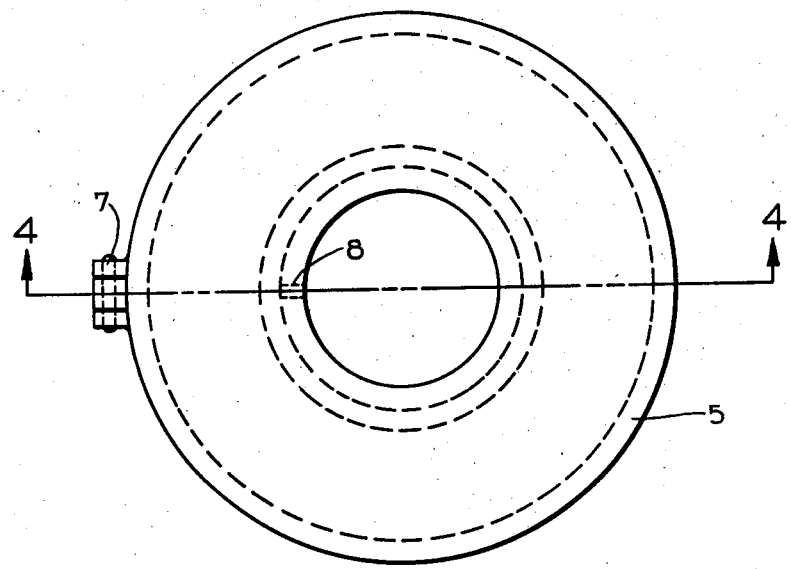
Fig. 3 is a plan view of a diagrammatic representation of a conventional inner tube mold.
Figure 4:
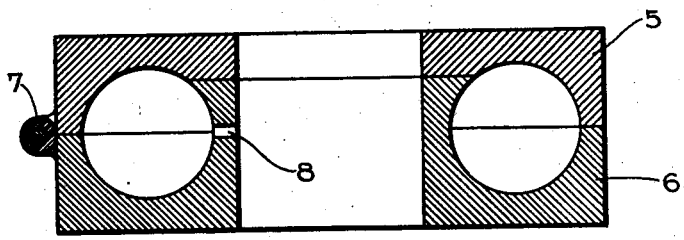
Fig. 4 is a sectional elevation of the mold taken along the line 4—4 of Fig. 3.

The extruded tube is made with the tread side about 0.210 inch thick and the rim side 0.150 inch so as to compensate for the stretching which occurs on the tread side during the subsequent operations. The tube is cut to 54 inch lengths and a 0.75 inch hole punched on the rim side about 6 inches from one end. A valve stem was inserted in the hole and the periphery thereof tightly gripped between a shoulder on the valve stem and a ring nut threaded on the valve stem. The ends of the tube were then butt spliced to produce an endless tube which was 17.25 inches in outside diameter when uninflated. The splice was then cooled by dipping it in a mixture of solid carbon dioxide and acetone for about 10 seconds. The tube was then inserted in the lower half of a tube mold such as shown in Figs. 3 and 4 after which the mold was closed and the tube inflated. The tube mold had an outside or tread diameter of 31.375 inches, an inside or rim diameter of 16.25 inches, and a cross-section diameter of 7.5625 inches, and the tube, especially the tread surface was stretched by the inflation until it filled the entire mold. The lapsed time between the cooling step and the completion of the inflation was about three minutes at which time the joint was still at a temperature below 50° F.

The mold was then placed in a curing oven heated at 300° F. to 340° F. for one hour. The inner tube so produced had a perfectly bonded splice and was strong, tough and exceptionally resistant to the transmission of air.

Although the invention has been described with respect to specific details it is not intended that such details shall be construed as limitations upon the scope of the invention except to the extent incorporated in the following claims.

I claim:

1. A method of splicing and vulcanizing unvulcanized butyl rubber containing vulcanization agents incorporated therein which comprises joining the unvulcanized butyl rubber parts by contacting said parts under pressure, cooling the joint to a temperature below 50° F. by contact with a liquid at a temperature not higher than 32° F., fixing the joint in the position for vulcanization by contact with a surface of the shape and size of the desired part after vulcanization and heating to effect vulcanization.

2. A method of splicing a tube of unvulcanized butyl rubber containing vulcanization agents incorporated therein which comprises joining the ends of the tube under pressure in the position of the desired splice, cooling the joint at a temperature below 50° F. by contact with a liquid at a temperature not higher than 32° F., inflating the tube to the desired size and shape in contact with a confining surface, and heating the joint to effect vulcanization.

3. The method of manufacturing an inner tube of butyl rubber which comprises extruding a continuous tube of unvulcanized butyl rubber containing incorporated therein the vulcanization agents, cutting a predetermined length of said tube, joining the ends of the cut length of tubing by contact under pressure so as to hermetically seal the tube, cooling the joint to a temperature below 50° F. by contact with a liquid at a temperature not higher than 32° F., inflating the tube until it is in contact with the interior surface of a mold, and heating at a temperature between 200 and 400° F. to effect vulcanization.

4. A method of splicing and vulcanizing an inner tube of butyl rubber having compounded therein suitable vulcanization agents which comprises joining the ends of said tube by contact under pressure to form a continuous hermetically sealed tube, cooling the joined ends by contact with a liquid at a temperature not higher than 32° F., inflating the tube with a gaseous medium in contact with a confining surface of the desired shape, and heating the tube to a temperature between 200° F. and 400° F. until the butyl rubber is vulcanized.

5. In the method of fabricating unvulcanized butyl rubber containing vulcanization agents compounded therein to form inflatable torus-shaped articles by the method of extruding a continuous tube of said unvulcanized rubber, cutting said tube to the desired length, splicing the ends of said length by contact under pressure, inflating the spliced tube in a mold of the desired shape and size, which mold is slightly larger than the unvulcanized spliced article, and heating to effect a vulcanization, the improvement which comprises cooling the spliced joint to a temperature of less than 50° F. by contact with a liquid at a temperature not higher than 32° F. prior to the inflation and maintaining said temperature until the tube is inflated.

6. In the method of fabricating unvulcanized butyl rubber containing vulcanization agents compounded therein to form inflatable tubular articles by the method of extruding a continuous tube of said unvulcanized rubber, cutting said tube to the desired length, splicing the ends of said length by contact under pressure, inflating the spliced tube in a mold of the desired shape and size, which mold is slightly larger than the unvulcanized article, and heating to effect vulcanization, the improvement which comprises cooling the spliced joint until all parts thereof are at a temperature less than 50° F. by contact with a liquid at a temperature below 32° F. and maintaining said temperature until the inner tube is completely inflated.

7. In the method of fabricating unvulcanized butyl rubber containing vulcanization agents compounded therein to form inflatable tubular articles by the method of extruding a continuous tube of said unvulcanized rubber, cutting said tube to the desired length, splicing the ends of said length by contact under pressure, inflating the spliced tube in a mold of the desired shape and size, which mold is slightly larger than the unvulcanized article and heating to effect vulcanization, the improvement which comprises cooling the spliced joint until all parts thereof are at a temperature less than 50° F. by contact with a mixture of solid carbon dioxide and acetone and maintaining said temperature until the inner tube is completely inflated.

8. A method of splicing and vulcanizing unvulcanized butyl rubber containing vulcanization agents incorporated therein which comprises joining the unvulcanized butyl rubber parts by contacting said parts under pressure, cooling the joint to a temperature between 0° F. and 40° F. by contact with a liquid at a temperature not higher than 32° F., fixing the joint in a position for vulcanization by contact with a surface of the shape and size of the desired part after vulcanization, and heating to effect vulcanization.

9. In the method of fabricating unvulcanized butyl rubber containing vulcanization agents compounded therein, to form inflatable torus-shaped articles by the method of extruding a continuous tube of said unvulcanized rubber, cutting said tube to the desired length, splicing the ends of said length by contact under pressure, inflating the spliced tube in a mold of the desired shape and size, which mold is slightly larger than the unvulcanized spliced article and heating to effect vulcanization, the improvement which comprises cooling the spliced joint to a temperature between 0° F. and 40° F. by contact with a liquid at a temperature not higher than 32° F. prior to the inflation and maintaining said temperature until the tube is inflated.

FRANK F. SILVER.

REFERENCES CITED

The following references are of record in the file of this patent:

UNITED STATES PATENTS

| Number | Name | Date |
| --- | --- | --- |
| 1,177,678 | Bierer | Apr. 4, 1916 |
| 1,625,284 | Seaton | Apr. 19, 1927 |
| 1,634,160 | Semple | June 28, 1927 |
| 2,356,130 | Thomas et al. | Aug. 22, 1944 |